United States Patent [19]
Aishima et al.

[11] 3,917,746
[45] Nov. 4, 1975

[54] IMPACT RESISTANT POLYMER COMPOSITIONS

[75] Inventors: Itsuho Aishima, Tokyo; Hisaya Saurai, Kawasaki; Atsushi Kitaoka; Yoshihiko Katayama, both of Nobeoka, all of Japan

[73] Assignee: Asahi Kasei Kogyo Kabushiki Kaisha, Osaka, Japan

[22] Filed: May 17, 1971

[21] Appl. No.: 144,242

Related U.S. Application Data

[63] Continuation-in-part of Ser. No. 699,303, Jan. 22, 1968, abandoned.

[30] Foreign Application Priority Data

Feb. 2, 1967  Japan............................ 42-6294

[52] U.S. Cl......................... 260/876 B; 260/878 B
[51] Int. Cl..................................... C08f 29/12
[58] Field of Search........................ 260/876 B

[56] References Cited
UNITED STATES PATENTS

| | | |
|---|---|---|
| 3,328,486 | 6/1967 | Crawford et al................. 260/876 |
| 3,358,053 | 12/1967 | Hostetler........................... 260/876 |
| 3,442,978 | 5/1969 | Khelghatian et al............ 260/876 B |
| 3,487,128 | 12/1969 | Okazaki et al.................... 260/876 |
| 3,627,852 | 12/1971 | Aishima et al.................... 260/876 |
| 3,632,674 | 1/1972 | Aishima et al.................... 260/876 |
| 3,649,579 | 3/1972 | Gobran et al.................. 260/876 B |

FOREIGN PATENTS OR APPLICATIONS

1,358,708    3/1964    France

*Primary Examiner*—Wilbert J. Briggs, Sr.
*Attorney, Agent, or Firm*—Flynn & Frishauf

[57] ABSTRACT

An ethylene/propylene block copolymer composition having an excellent impact resistance at low temperature comprising 70–95% by weight of an ethylene/propylene block copolymer having an ethylene content of 0.5–8% by weight, said block copolymer consisting of a statistical ethylene/propylene copolymeric block and a propylene homopolymeric block which are arranged in an optional recurring cycle and containing no terminal polyethylene block, and 5–30% by weight of polyethylene having a density not lower than 0.94 at 23°C. and prepared by a low or medium pressure process.

3 Claims, No Drawings

IMPACT RESISTANT POLYMER COMPOSITIONS

CROSS REFERENCE TO RELATED APPLICATION:

This is a Continuation-in-part application of U.S. Pat. application Ser. No. 699,303 filed Jan. 22, 1968, which has been abandoned.

BACKGROUND OF THE INVENTION:

1. Field of the Invention

This invention relates to an ethylene/propylene block copolymer composition having an excellent impact resistance. More particularly, it relates to a polymer composition having a remarkably excellent low temperature characteristic, particularly an excellent impact resistance at low temperatures comprising an ethylene/propylene copolymer consisting of a statistical ethylene/propylene copolymeric block and a propylene homopolymeric block, and polyethylene prepared by a low or medium pressure process.

2. Description of the Prior Art

Ever since the surprising discovery made by Ziegler and Natta with regard to the stereospecific polymerization, there have been produced various crystalline polyolefins on a commercial scale and they have occupied a solid position in the industrial field as a versatile plastics.

Particularly, the crystalline polypropylene is drawing attention as a resin of great utility because of its excellent rigidity, strength and resistance to high-temperature and being blessed with a promising future.

However, the crystalline polypropylene has a serious drawback in that it is quite brittle at temperatures below 5°C., thus, it cannot be used in the fields where it is subjected to low temperatures and for the purposes in which an impact resistance is required at relatively low temperatures.

There have been made many attempts to overcome this fundamental drawback of crystalline polypropylene and a number of processes for modifying the otherwise useful polymer have been proposed heretofore.

For example, it is known well that the impact resistance at low temperature may be improved by blending the crystalline polypropylene with a synthetic rubber.

However, in order to improve the impact resistance of crystalline polypropylene to a practical extent according to such a process, a considerable amount of synthetic rubber must be blended therewith and there is a disadvantage in that the rigidity, strength and resistance to high-temperature which are inherent features of the crystalline polypropylene are drastically damaged by the incorporation of large amount of synthetic rubber.

There has also been proposed an attempt to improve the impact resistance at low temperatures of crystalline polypropylene by blending polyethylene therewith.

In this process, however, true as it is that there occurs no important damage in the superior properties of crystalline polypropylene such as the rigidity, strength and resistance to high temperature, as a matter of fact, the impact resistance at low temperatures can be improved very little even if a considerable amount of polyethylene is incorporated into the crystalline polypropylene.

U.S. Pat. No. 3,328,486 to Crawford et al propose a composition which comprises polyethylene having a density not greater than 0.935 and an ethylene-propylene block copolymer, and U.S. Pat. No. 3,358,053 to Hostetler et al proposes a composition comprising a polyethylene having a density of 0.93 to 0.96 and ethylene-propylene copolymer terminated by a block of polyethylene. However, the former is inferior in impact strength at low temperatures, drop cone impact strength and Rockwell hardness, and the latter is also inferior in impact strength at low temperatures and drop cone impact strength.

SUMMARY OF THE INVENTION:

It is, therefore, an object of this invention to provide a polymer composition having an greatly enhanced impact strength at low temperatures without sacrificing the features of crystalline polypropylene such as the rigidity, strength and resistance to high-temperature, overcoming the disadvantages accompanied by the prior art processes known heretofore.

In accordance with this invention, there is obtained a polymer composition having a well-balanced performance in which the inherent and desirable properties of polypropylene are retained without being damaged, while the low temperature characteristic which is a great drawback of polypropylene is remarkable improved.

More particularly, in accordance with this invention, there is provided a polymer composition having an excellent impact resistance at low temperature which comprises 70 – 95% by weight of an ethylene/propylene block copolymer having an ethylene content of 0.5 – 8% by weight, said block copolymer consisting of a statistical ethylene/propylene copolymeric block and a propylene homopolymeric block which are arranged in an optional recurring cycle and containing no terminal polyethylene block (this copolymer may be referred to as "ethylene/propylene block copolymer having a statistical copolymeric block"), and 5 – 30% by weight of a polyethylene having a density not lower than 0.94 at 23°C. and prepared by a low or medium pressure process.

As described hereinbefore, the feature of this invention is that there is obtained a polymer composition having a well-balanced performance in which the impact resistance at low temperature is greatly enhanced while retaining the inherent and desirable properties of crystalline polypropylene, i.e., the high rigidity and high strength and excellent resistance to high temperature, by blending an ethylene/propylene block copolymer having a statistical copolymeric block containing a minor portion of ethylene with a high density polyethylene prepared by a low or medium pressure process.

In this invention, the ethylene content in the block copolymer, the presence of statistical copolymeric block and the density of polyethylene to be blended are critical.

For example, if a block copolymer having higher ethylene content is used, or, if a statistical ethylene/propylene copolymer in which the ethylene content is low but the ethylene is distributed statistically throughout the whole region of the polymeric chain is used, or, if a low density polyethylene having a large degree of branching is used, the feature of this invention may not be enjoyed and there is obtained only a composition having poorly-balanced physical properties.

The presence of the statistical copolymeric block in the block copolymer enhances the affinity with polyethylene blended therewith as compared with that of ethylene/propylene block copolymer consisting only of propylene homopolymeric block and ethylene homopolymeric block, and as a result, in the present invention, the impact resistance at low temperatures can be greatly improved by the blending of polyethylene in a small amount. Since the amount of polyethylene to be blended can thus be reduced, the superior properties of crystalline polypropylene such as the rigidity, strength and resistance to high temperature are scarcely damaged.

The characteristic of the composition of this invention may not be obtained by preparing an ethylene/propylene block copolymer by block copolymerizing ethylene with propylene.

That is, if the ethylene content in the copolymer is less than 8%, the improving effect on the imparct resistance at low temperatures is unsatisfactorily small, though the rigidity, strength and resistance to high temperature of polypropylene may not practically be damaged, while, the ethylene content exceeding 8% leads to a drastic deterioration in the rigidity, strength and resistance to high temperature, though the impact resistance may be enhanced.

It is quite surprising that the improving effect unexpectable from a composition obtained by blending a crystalline polypropylene with a high density polyethylene can be accomplished by the blending of an ethylene/propylene block copolymer consisting of a stastical ethylene/propylene copolymeric block containing a minor proportion of ethylene and propylene homopolymeric block with a high density polyethylene prepared by a low or medium pressure process, and it is presumed that these two compositions are different from each other with respect not only to the microstructure but also to the macro-structure.

The ethylene/propylene block copolymer which may be used in the composition of this invention means such ethylene/propylene block copolymers having a statistical copolymeric block consisting of ethylene and propylene, and a propylene homopolymeric block as constituents of its polymeric molecular chain.

As far as the block copolymer and a process for producing the same are concerned, M. Zuback et al describes in Journal of the American Chemical Society, vol. 78, pp. 2656 downwards (1956) that a styrene/butadiene block copolymer may be obtained in the presence of naphthalene anion as a polymerization initiator under a condition in which a molecular chain of the polymer maintains a potential ability of growth in an ionic polymerization.

It is quite easy to produce ethylene/propylene block copolymer which is used in this invention by adopting the process mentioned above and, as can be predicted from the structure of the resultant copolymer, the polymer having less ethylene content possesses a rigidity, strength and resistance to high temperature practically as high as those of crystalline polypropylene.

Copolymerization catalysts useful for the production of ethylene/propylene block copolymer which may be used in this invention include the conventional stereospecific polymerization catalysts capable of polymerizing propylene to form crystalline polypropylene such as, for example, a binary catalyst consisting of an organometallic compound of metals of Groups I – III of the Periodic Table of the Elements and a halide of metals of Groups IV – VIII of said Table.

One useful and simple process for producing the block copolymer used for the composition of this invention is to supply ethylene intermittently to a polymerization system in which propylene is being polymerized in the presence of the above-mentioned catalyst.

When producing a block copolymer consisting of a propylene homopolymeric block and an ethylene homopolymeric block, it is normally necessary, after a polymer chain of one of the monomers is first prepared, that the surface of the catalyst is cleaned from unreacted monomer by inert gas such as nitrogen or helium, or, the unreacted monomer is removed from the surface of the catalyst by reducing the pressure of the atmosphere and subsequently the other monomer to be copolymerized is introduced. In contrast, no such process is required in the process for producing the block copolymer used for the composition of this invention. In addition, the control of the molecular weight can be done in the same manner as in the polymerization of propylene and no critical control of temperature and concentration of molecular weight controller are required.

The applicability of such useful copolymer which can be easily produced on a commercial scale to the composition of this invention constitutes a feature of this invention.

The alternation of the monomers can be conducted for as many times as required and the process can be practised in a commercial scale either batch-wise or continuously.

The ethylene content in the ethylene/propylene block copolymer having a statistical copolymeric block thus obtained is 0.5 – 8.0% by weight, preferably 0.5 – 5.0% by weight. The resulting copolymer has practically the same rigidity, strength and resistance to high temperature as with a crystalline polypropylene and the impact resistance at low temperature is not practically improved.

The polyethylene used in practising the present invention is a so-called "high-density linear polyethylene" having a density of not less than 0.94 at 23°C. and an average molecular weight ranging from 10,000 to 1,000,000 which is produced by a low or medium pressure process.

In order to obtain the composition of this invention having a remarkably improved impact resistance and retaining a rigidity, strength and resistance to high temperature as high as those of crystalline polypropylene, it is necessary to use 70 – 95% by weight of a ethylene/propylene block copolymer having a statistical copolymeric block and 5 – 30% by weight of a polyethylene prepared by a low or medium pressure process.

In a polymer composition having a composition outside the range specified above, a good balance between the impact resistance and other mechanical properties such as the tensile modulus, hardness, etc, may not be retained and such polymer composition has a poor utility.

In the blended composition of this invention, a small amount of conventional thermal or light stabilizer may be incorporated in accordance with the conventional procedures to take precautions not to degrade the qualities of respective constituent polymers in the mixing or moulding process as well as in the actual use of the composition.

In practising the present invention, it is important to carry out the mixing uniformly in a molten state and a suitable temperature must be selected for an optimum uniform mixing. For this purpose, the mixing by a roll, screw extruder, Banbury mixer, or other conventional mixing methods may be conveniently adopted.

DESCRIPTION OF PREFERRED EMBODIMENTS:

This invention will be explained more practically in the following Examples. It should not be construed, however, that these Examples restrict this invention as they are given merely by way of examples. In the following Examples, the percentages referred to therein are all % by weight:

EXAMPLES 1 – 2 AND COMPARATIVE EXAMPLES 1 – 5

To a 25 liter capacity glass-lined pressure reactor provided with an agitator were charged 15 liters of purified n-hexane and a catalyst prepared from titanium trichloride and diethylaluminum chloride in an amount of 3 m.mol of titanium metal per liter of n-hexane and the temperature of the reactor was maintained at 85°C. with agitation. To the reactor were then supplied in sequence propylene mixed with hydrogen for an hour so as to maintain the pressure at 4 kg./cm.$^2$, an ethylene-propylene mixture mixed with hydrogen for one minute, and, after the polymerization has substantially been completed, propylene mixed with hydrogen for an hour followed by an ethylene-propylene mixture mixed with hydrogen for one minute. The polymerization reaction was carried out for the overall period of 3 hours.

The resulting copolymer was purified by methanol containing hydrochloric acid to give a powdered crystalline ethylene/propylene block copolymer. The block copolymer had an intrinsic viscosity as measured in tetralin at 135°C, hereinafter referred to simply as "intrinsic viscosity", of 2.7 and 94.5% of n-heptane extraction residue. The ethylene content of the product polymer was determined as 3.0% according to conventional infrared absorption spectrography.

In the measurement by Differential Scanning Colorimeter, Model DSC-1 manufactured by Perkin-Elmer Corp., there was not observed the peak corresponding to polyethylene block which had melting point of 130°C., though the peaks corresponding to polypropylene blocks which had melting point of 166°C. were observed. As a result of this measurement, the product copolymer was confirmed not to contain any polyethylene blocks.

For comparison, a crystalline polypropylene having an intrinsic viscosity of 2.6 and n-heptane extraction residue of 94.5% was obtained according to the same procedures as described above except no ethylene was copolymerized therewith.

With the resulting ethylene/propylene block copolymer was mixed various amounts as specified in the following Table 1 of polyethylene having an average molecular weight of 80,000 and a density of 0.95 at 23°C. which was prepared by a low pressure process, and the resulting mix was kneaded in a molten state using a Banbury mixer under a nitrogen atmosphere at 190°C. for 10 minutes. The mix thus kneaded was subsequently rolled on an open roll at room temperature and the resulting sheet was pelletized at 230°C. under a nitrogen atmosphere.

The composition thus obtained was compression moulded according to the method described in ASTM638-61 to give a test piece of a dumbbell shape. After the test piece was conditioned for 72 hours, the physical properties thereof were measured according to the following ASTM Standards:

Izod impact strength:
ASTM D256-56 unit - kg.·cm./cm.
(Notched) Measuring temperatures: 23°C., 0°C., −30°C.
Tensile modulus:
ASTM D638-61T unit - kg./mm.$^2$
(Cross-head speed: 0.2 inch/min.)
Rockwell hardness:
ASTM D785-51 unit - R scale
Drop-cone impact strength:

A test piece of 2 mm. thickness was cooled at −20°C. for an hour and a cone-shaped weight was dropped thereon from a predetermined height and the energy required to destroy the sample was measured in terms of kg·m by using a Falling Missile Impact Tester made by Toyo Seiki Mfg., Co.

For comparison, the physical properties were measured in the same manner as described above with regards to crystalline polypropylene, ethylene/propylene block copolymer and a blended composition of crystalline polypropylene and polyethylene, respectively.

The results are shown in the following Table 1:

Table 1

|  |  | Composition (%) | | | Izod impact strength | | | Drop-cone impact strength | Tensile modulus | Rockwell hardness |
|---|---|---|---|---|---|---|---|---|---|---|
|  |  | Ethylene/propylene block copolymer | Poly-ethylene | Crystalline polypropylene | 23°C. | 0°C. | −30°C. | −20°C. | (kg/mm$^2$) | (R scale) |
| Comparative Examples | 1 | 0 | 0 | 100 | 2.50 | 1.75 | 1.70 | 0.07 | 118 | 86 |
|  | 2 | 0 | 5 | 95 | 3.03 | 1.86 | 1.70 | 0.09 | 111 | 82 |
|  | 3 | 0 | 10 | 90 | 3.72 | 1.63 | 1.80 | 0.09 | 110 | 79 |
|  | 4 | 0 | 15 | 85 | 3.88 | 1.63 | 1.58 | 0.12 | 110 | 77 |
|  | 5 | 100 | 0 | 0 | 2.80 | 2.00 | 1.70 | 0.12 | 117 | 83 |
| Examples | 1 | 85 | 15 | 0 | 9.50 | 7.00 | 4.60 | 8.20 | 111 | 80 |
|  | 2 | 90 | 10 | 0 | 8.00 | 6.00 | 3.90 | 7.60 | 114 | 82 |

As can be clearly noted from the above Table 1, the impact resistance at low temperatures is not practically improved in the crystalline polypropylene, ethylene/propylene block copolymer or the blended composition of crystalline polypropylene and polyethylene, as shown in Comparative Examples 1 – 5.

In contrast, in the composition of this invention, the impact resistance at low temperatures is remarkably improved while retaining the tensile strength and hardness as high as those of crystalline polypropylene.

COMPARATIVE EXAMPLES 6 AND 7:

Propylene to which a small amount of hydrogen was added as a molecular weight controller, was polymerized in n-hexane in the presence of a catalyst consisting of titanium trichloride and diethylaluminum chloride (Ti contents : 3 m.mol/liter of n-hexane) and the polymerization was carried out at 85°C. continuously while charging ethylene intermittently to the polymerization system at an interval of one hour for a period of two minutes each.

The resulting copolymer was purified by methanol containing hydrochloric acid to give a powdered crystalline ethylene/propylene block copolymer. The block copolymer had an intrinsic viscosity of 2.7 and n-heptane extraction residue of 94.5%.

According to a conventional infrared absorption spectrography, it was found that the ethylene content of the block copolymer was 3.0%.

With the resulting ethylene/propylene block copolymers were mixed various amounts as specified in the following Table 2 of polyethylenes having an average molecular weight of 80,000 and a density 0.925 at 23°C. It is generally difficult to obtain a commercial polyethylene prepared by a high pressure process and having a density higher than 0.925. The resulting mix was kneaded in a molten state using a Banbury mixer under a nitrogen atmosphere at 190°C. for 10 minutes. The mix thus kneaded was subsequently rolled on an open roll at room temperature and the resulting sheets were pelletized at 230°C. under a nitrogen atmosphere.

The compositions thus obtained were compression moulded according to the method described in ASTM638-61 to give test pieces of a dumb-bell shape. After the test pieces were conditioned for 72 hours, the physical properties thereof were measured according to the same method as in Examples 1 and 2.

The results are shown in the following Table 2.

to 5 p.s.i.g., cooled to 38°C. and ethylene is introduced at the rate of 0.2 g. per minute for 60 minutes. The pressure at the end of $C_2H_4$ addition is 1 p.s.i.g. and the maximum temperatures is 55°C. The polymer produced is a propylene/ethylene random copolymer having a terminal block of ethylene.

The reactor is then vented and the polymer is purified and recovered by the following procedure. The polymer is transferred into a 2 liter beaker and washed for 2 hours at 70°C. with 1 liter of a 50—50 volume mixture of heptane and isopropyl alcohol. After filtering the washing is repeated with fresh heptane-isopropyl alcohol mix. The wet polymer is vacuum dried for 8 hours at 80°C.

There is obtained 163 g. of dry powdered polymer with a melt index at 230°C. of 3.8 and an intrinsic viscosity of 5.6. By infrared analysis the resin is found to contain 6.2% ethylene.

With the resulting ethylene/propylene block copolymers were mixed various amounts as specified in the following Table 3 of polyethylene having an average molecular weight of 80,000 and a density of 0.945 at 23°C. and prepared by a low pressure process ("Hizex 5100B", trade name, product of Mitsui Petrochemical Co., Ltd.) and the resulting mix was kneaded in a molten state using a Banbury mixer under a nitrogen atmosphere at 190°C. for 10 minutes. The mix thus kneaded was subsequently rolled on an open roll at room tem- Table 2

| | Composition (%) | | Izod impact strength | | | Drop-cone impact strength −20°C. | Tensile modulus (kg/mm²) | Rockwell hardness R scale |
|---|---|---|---|---|---|---|---|---|
| | Ethylene-propylene block copolymer | Polyethylene (d=0.925) | 23°C. | 0°C. | −30°C. | | | |
| Comparative Example 6 | 85 | 15 | 3.9 | 2.7 | 2.1 | 1.8 | 65 | 47 |
| Comparative Example 7 | 90 | 10 | 3.6 | 2.6 | 1.9 | 1.9 | 70 | 50 |

COMPARATIVE EXAMPLES 8 AND 9

To a 700 ml. stirred stainless steel reactor is charged, under an inert atmosphere, 0.28 g. of $3TiCl_3 \cdot AlCl_3$ and 4.0 cc. of 1 molar diethyl aluminum chloride in cyclohexane. The Al/Ti mole ratio is 2/1. The reactor is purged with hydrogen, closed, and pressured to 5 p.s.i.g. with $H_2$. Then 400 ml. of liquid propylene is introduced with stirring at 24°C. The polymerization temperature is increased within about 10 minutes to 60°C. with external heating. The reactor pressure is that of the propylene gas at equilibrium. Five minutes after the propylene charge, 0.3 g. of ethylene is added gradually over a period of 15 seconds. The ethylene addition, which is used up in 1–2 minutes, is repeated every 15 minutes until 2.1 g. of ethylene is added. At the end of the first hour, 200 ml. additional propylene is added to maintain a slurry in the reactor. At the end of one hour and 45 minutes the reactor is then vented perature and the resulting sheets were pelletized at 23°C. under a nitrogen atmosphere.

The compositions thus obtained were compression moulded according to the method described in ASTM638-61 to give test pieces of a dumb-bell shape. After the test pieces were conditioned for 72 hours, the physical properties thereof were measured according to the same method as in Examples 1 and 2.

The results are shown in the following Table 3.

Table 3

| | Composition (%) | | Izod impact strength | | | Drop-cone impact strength −20°C. | Tensile modulus (kg/mm²) | Rockwell hardness R scale |
|---|---|---|---|---|---|---|---|---|
| | Ethylene-propylene block copolymer | Polyethylene | 23°C. | 0°C. | −30°C. | | | |
| Comparative Example 8 | 85 | 15 | 4.5 | 3.5 | 2.0 | 1.6 | 105 | 98 |
| Comparative Example 9 | 90 | 10 | 3.6 | 2.0 | 1.9 | 1.7 | 110 | 80 |

EXAMPLES 3–4:

Examples 1 – 2 were repeated according to the same procedures as described therein except that the intermittent supply of ethylene was carried out for 4 minutes instead of 2 minutes.

The resulting ethylene/propylene block copolymer had an intrinsic viscosity of 2.8, n-heptane extraction residue of 93.0% and an ethylene content of 4.5% and was confirmed not to contain any terminal polyethylene blocks by Differential Scanning Colorimeter. The block copolymer was blended with polyethylene having a density of 0.96 and an average molecular weight of 70,000 and prepared by a low pressure process according to the same procedures as in Examples 1 – 2 and the physical properties of the resulting compositions were measured with the following results as shown in Table 4.

Table 4

| | | Composition (%) | | Izod impact strength | | | Drop-cone impact strength | Tensile modulus | Rockwell hardness |
|---|---|---|---|---|---|---|---|---|---|
| | | Ethylene/ propylene block copolymer | Poly- ethylene | 23°C. | 0°C. | −30°C. | −20°C. | (kg/mm$^2$) | (R scale) |
| Examples | 3 | 85 | 15 | 13.00 | 8.00 | 5.50 | 9.00 | 107 | 76 |
| | 4 | 90 | 10 | 10.00 | 6.50 | 5.00 | 8.50 | 110 | 78 |

As can be clearly noted from the above Table 4, in accordance with this invention, there is obtained a polymer composition having remarkably improved impact resistance at low temperatures and well-balanced physical properties.

I claim:

1. An ethylene/propylene block copolymer composition having an excellent impact resistance at low temperatures consisting essentially of 70–95% by weight of an ethylene/propylene block copolymer having an ethylene content of 0.5–8.0% by weight, said block copolymer consisting of a statistical ethylene/propylene copolymeric block and a propylene homopolymeric block which are arranged in an optical recurring cycle and containing no terminal polyethylene block, said block copolymer being substantially insoluble in n-heptane and being formed by supplying ethylene intermittently to a polymerization system in which propylene is being polymerized in the presence of a stereospecific polymerization catalyst, and 5–30% by weight of a polyethylene having a density not lower than 0.94 at 23°C. and prepared by a low or medium pressure process.

2. An ethylene/propylene block copolymer composition as claimed in claim 1 wherein said polyethylene is a high-density polyethylene having an average molecular weight from 10,000 to 1,000,000.

3. An ethylene/propylene block copolymer composition as claimed in claim 1, wherein said ethylene/propylene block copolymer has an ethylene content of 0.5 – 5.0% by weight.

* * * * *